(12) United States Patent
Wilkins et al.

(10) Patent No.: US 9,094,681 B1
(45) Date of Patent: Jul. 28, 2015

(54) ADAPTIVE SEGMENTATION

(75) Inventors: Paul Gordon Wilkins, Cambridge (GB); Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 672 days.

(21) Appl. No.: 13/407,073

(22) Filed: Feb. 28, 2012

(51) Int. Cl.
| | |
|---|---|
| H04N 11/02 | (2006.01) |
| H04N 19/124 | (2014.01) |
| G06T 7/00 | (2006.01) |
| H04N 19/119 | (2014.01) |

(52) U.S. Cl.
CPC ............ *H04N 19/124* (2013.01); *G06T 7/0081* (2013.01); *H04N 19/119* (2013.01)

(58) Field of Classification Search
CPC ............. G06T 7/2066; H04N 19/0009; H04N 19/00133
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,469,273 A | 11/1995 | Demura | |
| 5,510,842 A | 4/1996 | Phillips et al. | |
| 5,512,952 A | 4/1996 | Iwamura | |
| 5,532,744 A | 7/1996 | Akiwumi-Assani et al. | |
| 5,589,945 A | 12/1996 | Abecassis | |
| 5,604,822 A * | 2/1997 | Pearson et al. ................. | 382/199 |
| 5,617,541 A | 4/1997 | Albanese et al. | |
| 5,659,539 A | 8/1997 | Porter et al. | |
| 5,696,869 A | 12/1997 | Abecassis | |
| 5,731,840 A | 3/1998 | Kikuchi et al. | |
| 5,761,423 A | 6/1998 | Lee | |
| 5,767,987 A | 6/1998 | Wolff et al. | |
| 5,793,647 A | 8/1998 | Hageniers et al. | |
| 5,818,967 A | 10/1998 | Bhattacharjee et al. | |

(Continued)

FOREIGN PATENT DOCUMENTS

| | | |
|---|---|---|
| EP | 0634873 | 1/1995 |
| EP | 1903698 | 3/2008 |

(Continued)

OTHER PUBLICATIONS

Cicconi et al., "Efficient Region-Based Motion Estimation and Symmetry Oriented Segmentation for Image Sequence Coding," IEEE Trans. on Circuits and Systems for Video Technology, vol. 4, No. 3, Jun. 1994, pp. 357-364.

(Continued)

*Primary Examiner* — Christopher S Kelley
*Assistant Examiner* — Christopher Findley
(74) *Attorney, Agent, or Firm* — Young Basile Hanlon & MacFarlane P.C.

(57) ABSTRACT

Disclosed herein are systems, methods, and apparatuses for selecting different coding parameters for different portions of a video frame or image to be transmitted or stored for later decoding. The coding parameters for a particular portion of a video frame or image are selected according to their distance from a selected point of interest, where the parameters can be selected to alter the tradeoff between transmission bandwidth and perceived image quality to preserve image quality in areas designated as high interest while saving transmission bandwidth for areas designated as having less interest. Also disclosed are associated systems, methods, and apparatuses for decoding such encoded video frames or images.

20 Claims, 10 Drawing Sheets

(56) References Cited

U.S. PATENT DOCUMENTS

| | | |
|---|---|---|
| 5,828,370 A | 10/1998 | Moeller et al. |
| 5,886,652 A | 3/1999 | Adachi et al. |
| 5,886,742 A | 3/1999 | Hibi et al. |
| 5,903,264 A | 5/1999 | Moeller et al. |
| 5,930,493 A | 7/1999 | Ottesen et al. |
| 5,963,203 A | 10/1999 | Goldberg et al. |
| 5,991,428 A | 11/1999 | Taniguchi |
| 5,991,447 A | 11/1999 | Eifrig et al. |
| 6,005,980 A | 12/1999 | Eifrig et al. |
| 6,014,706 A | 1/2000 | Cannon et al. |
| 6,104,751 A | 8/2000 | Artieri |
| 6,108,383 A | 8/2000 | Miller et al. |
| 6,112,234 A | 8/2000 | Leiper |
| 6,119,154 A | 9/2000 | Weaver et al. |
| 6,157,326 A | 12/2000 | Van Der Vleuten et al. |
| 6,173,012 B1 | 1/2001 | Katta et al. |
| 6,185,363 B1 | 2/2001 | Dimitrova et al. |
| 6,208,765 B1 | 3/2001 | Bergen |
| 6,212,235 B1 | 4/2001 | Nieweglowski et al. |
| 6,256,423 B1 | 7/2001 | Krishnamurthy et al. |
| 6,272,179 B1 | 8/2001 | Kadono |
| 6,285,804 B1 | 9/2001 | Crinon et al. |
| 6,289,049 B1 | 9/2001 | Kim et al. |
| 6,292,837 B1 | 9/2001 | Miller et al. |
| 6,349,154 B1 | 2/2002 | Kleihorst |
| 6,359,929 B1 | 3/2002 | Boon |
| 6,381,277 B1 | 4/2002 | Chun et al. |
| 6,434,197 B1 | 8/2002 | Wang et al. |
| 6,473,460 B1 | 10/2002 | Topper |
| 6,538,698 B1 | 3/2003 | Anderson |
| 6,542,541 B1 | 4/2003 | Luna et al. |
| 6,574,273 B1 | 6/2003 | Luna et al. |
| 6,600,786 B1 | 7/2003 | Prakash et al. |
| 6,628,845 B1 | 9/2003 | Stone et al. |
| 6,650,704 B1 | 11/2003 | Carlson et al. |
| 6,654,418 B2 | 11/2003 | Haskell et al. |
| 6,687,303 B1 | 2/2004 | Ishihara |
| 6,711,209 B1 | 3/2004 | Lainema et al. |
| 6,735,249 B1 | 5/2004 | Karczewicz et al. |
| 6,775,326 B2 | 8/2004 | Sekiguchi et al. |
| 6,778,553 B1 | 8/2004 | Chou |
| 6,810,149 B1 | 10/2004 | Squilla et al. |
| 6,907,079 B2 | 6/2005 | Gomila et al. |
| 6,987,889 B1 * | 1/2006 | Horowitz ............... 382/239 |
| 7,116,830 B2 | 10/2006 | Srinivasan |
| 7,173,968 B1 | 2/2007 | Kutka et al. |
| 7,177,358 B2 * | 2/2007 | Inomata et al. .......... 375/240.12 |
| 7,184,482 B2 | 2/2007 | Prakash et al. |
| 7,218,674 B2 | 5/2007 | Kuo |
| 7,253,831 B2 | 8/2007 | Gu |
| 7,263,125 B2 | 8/2007 | Lainema |
| 7,305,135 B2 * | 12/2007 | Honda et al. ............... 382/236 |
| 7,403,662 B2 | 7/2008 | Mitchell et al. |
| 7,415,662 B2 | 8/2008 | Rothmuller et al. |
| 7,602,997 B2 | 10/2009 | Young |
| 7,609,887 B2 * | 10/2009 | Liang et al. ............... 382/173 |
| 7,672,377 B2 | 3/2010 | Heng et al. |
| 7,711,052 B2 | 5/2010 | Hannuksela et al. |
| 7,715,475 B1 | 5/2010 | Puri et al. |
| 7,773,670 B1 | 8/2010 | Puri et al. |
| 8,000,546 B2 | 8/2011 | Yang et al. |
| 8,179,981 B2 * | 5/2012 | Chen et al. ............... 375/240.27 |
| 8,359,656 B2 | 1/2013 | Kellerman et al. |
| 8,369,411 B2 | 2/2013 | Au et al. |
| 8,508,651 B2 | 8/2013 | Tsubaki et al. |
| 2002/0009153 A1 | 1/2002 | Jeon et al. |
| 2002/0026639 A1 | 2/2002 | Haneda |
| 2002/0031272 A1 | 3/2002 | Bagni et al. |
| 2002/0071485 A1 | 6/2002 | Caglar et al. |
| 2002/0176502 A1 | 11/2002 | Rose et al. |
| 2002/0181790 A1 | 12/2002 | Nakata |
| 2003/0035484 A1 | 2/2003 | Prakash et al. |
| 2003/0138045 A1 | 7/2003 | Murdock et al. |
| 2003/0154190 A1 | 8/2003 | Misawa et al. |
| 2003/0174217 A1 | 9/2003 | Kito et al. |
| 2003/0189652 A1 | 10/2003 | Takayama |
| 2003/0215018 A1 | 11/2003 | MacInnis et al. |
| 2004/0100505 A1 | 5/2004 | Cazier |
| 2004/0156437 A1 | 8/2004 | Lainema |
| 2004/0172440 A1 | 9/2004 | Nakajima et al. |
| 2004/0234144 A1 | 11/2004 | Sugimoto et al. |
| 2005/0046702 A1 | 3/2005 | Katayama et al. |
| 2005/0050043 A1 | 3/2005 | Pyhalammi et al. |
| 2005/0180500 A1 | 8/2005 | Chiang et al. |
| 2005/0192924 A1 | 9/2005 | Drucker et al. |
| 2005/0206785 A1 | 9/2005 | Swan et al. |
| 2005/0216186 A1 | 9/2005 | Dorfman et al. |
| 2005/0220352 A1 | 10/2005 | Wemelsfelder |
| 2005/0265447 A1 | 12/2005 | Park |
| 2005/0276323 A1 | 12/2005 | Martemyanov et al. |
| 2006/0072664 A1 | 4/2006 | Kwon et al. |
| 2006/0090141 A1 | 4/2006 | Loui et al. |
| 2006/0093038 A1 | 5/2006 | Boyce |
| 2006/0098738 A1 | 5/2006 | Cosman et al. |
| 2006/0153304 A1 | 7/2006 | Prakash et al. |
| 2006/0200475 A1 | 9/2006 | Das et al. |
| 2006/0251330 A1 | 11/2006 | Toth et al. |
| 2006/0285589 A1 | 12/2006 | Hannuksela |
| 2007/0025441 A1 | 2/2007 | Ugur et al. |
| 2007/0110290 A1 | 5/2007 | Chang et al. |
| 2007/0177673 A1 | 8/2007 | Yang |
| 2007/0217508 A1 | 9/2007 | Shimada et al. |
| 2007/0274385 A1 | 11/2007 | He |
| 2007/0274388 A1 | 11/2007 | Lee et al. |
| 2008/0152007 A1 | 6/2008 | Sekiguchi et al. |
| 2008/0181299 A1 | 7/2008 | Tian et al. |
| 2008/0187053 A1 | 8/2008 | Zhao et al. |
| 2008/0310745 A1 | 12/2008 | Ye et al. |
| 2009/0196342 A1 | 8/2009 | Divorra Escoda et al. |
| 2010/0023979 A1 | 1/2010 | Patel et al. |
| 2010/0061444 A1 | 3/2010 | Wilkins et al. |
| 2010/0067822 A1 | 3/2010 | Young |
| 2010/0070606 A1 | 3/2010 | Shenfield et al. |
| 2010/0070608 A1 | 3/2010 | Hosur |
| 2010/0074332 A1 | 3/2010 | Karczewicz et al. |
| 2010/0086028 A1 | 4/2010 | Tanizawa et al. |
| 2010/0098169 A1 | 4/2010 | Budagavi |
| 2010/0118945 A1 | 5/2010 | Wada et al. |
| 2010/0124274 A1 * | 5/2010 | Cheok et al. ............. 375/240.03 |
| 2010/0128796 A1 | 5/2010 | Choudhury |
| 2010/0142761 A1 | 6/2010 | Venkatapuram et al. |
| 2010/0278234 A1 | 11/2010 | Jeong et al. |
| 2010/0329334 A1 | 12/2010 | Kim et al. |
| 2011/0007977 A1 | 1/2011 | Amonou et al. |
| 2011/0235706 A1 | 9/2011 | Demircin et al. |
| 2011/0249743 A1 | 10/2011 | Zhao et al. |
| 2011/0264676 A1 | 10/2011 | Belan et al. |
| 2011/0293001 A1 | 12/2011 | Lim et al. |
| 2012/0014436 A1 | 1/2012 | Segall et al. |
| 2012/0014437 A1 | 1/2012 | Segall et al. |
| 2012/0014438 A1 | 1/2012 | Segall et al. |
| 2012/0014439 A1 | 1/2012 | Segall et al. |
| 2012/0014440 A1 | 1/2012 | Segall et al. |
| 2012/0014444 A1 | 1/2012 | Min et al. |
| 2012/0020408 A1 | 1/2012 | Chen et al. |
| 2012/0057630 A1 | 3/2012 | Saxena et al. |
| 2012/0106637 A1 | 5/2012 | Lee et al. |
| 2012/0106646 A1 | 5/2012 | Cammas et al. |
| 2012/0114035 A1 | 5/2012 | Nakagomi et al. |
| 2012/0114039 A1 | 5/2012 | Wang |
| 2012/0201475 A1 | 8/2012 | Carmel et al. |
| 2012/0257677 A1 | 10/2012 | Bankoski et al. |
| 2013/0195178 A1 * | 8/2013 | Price et al. ............... 375/240.03 |

FOREIGN PATENT DOCUMENTS

| | | |
|---|---|---|
| WO | WO02093488 | 11/2002 |
| WO | WO2005094083 | 10/2005 |
| WO | WO2010149900 | 12/2010 |

OTHER PUBLICATIONS

Salembier et al., "Segmentation-Based Video Coding system Allowing the Manipulation of Objects," IEEE Trans. on Circuits and Sys-

(56) References Cited

OTHER PUBLICATIONS tems for Video Technology, vol. 7, No. 1, Feb. 1997, pp. 60-74.
Zhang, Kui, et al.; "Variable Block Size Video Coding With Motion Prediction and Motion Segmentation", SPIE vol. 2419, 1995, 9 pp.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.
Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.
Glaser-Garrett, Jason, "A novel macroblock-tree algorithm for high-performance optimization of dependent video coding in H.264/AVC", Department of Computer Science, Harvey Mudd College, Date Unknown, 12 pp.
Guillotel, Philippe, et al.; "Comparison of motion vector coding techniques", SPIE vol. 2308, 1994, 11 pp.
Han et al, "Toward Jointly Optimal Spatial Prediction and Adaptive Transform in Video/Image Coding," ICASSP 2010 (Dallas, TX, Mar. 14-19, 2010).
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Park, Jun Sung, et al., "Selective Intra Prediction Mode Decision for H.264/AVC Encoders", World Academy of Science, Engineering and Technology 13, (2006).
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbits with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
International Search Report and the Written Opinion of the International Searching Authority, International Application No. PCT/US2011/053460, mailed on Dec. 16, 2011, 12 pages.
Wikipedia, the free encyclopedia, "Graphics Interchange Format", downloaded Jun. 24, 2014, 15 pp, http://en.wikipedia.org/w/index.php?title=Graphics_Interchange_Format&oldid=379610957.
Wikipedia, the free encyclopedia, "JPEG", downloaded Jun. 24, 2014, 15 pp, http://en.wikipedia.org/w/index.php?title=JPEG&oldid=387366433.
Wikipedia, the free encyclopedia, "Motion JPEG", downloaded Jun. 24, 2014, 5 pp, http://en.wikipedia.org/w/index.php?title=Motion_JPEG&oldid=386187797.
Wikipedia, the free encyclopedia, "Portable Network Graphics", downloaded Jun. 24, 2014, 19 pp, http://en.wikipedia.org/w/index.php?title=Portable_Network_Graphics&oldid=386636989#Animation.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

(56) References Cited

OTHER PUBLICATIONS

"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, VP8 Data format and Decoding Guide, RFC 6386, Nov. 2011.
Mozilla, "Introduction to Video Coding Part 1: Transform Coding", Video Compression Overview, Mar. 2012, 171 pp.
Fan. Z., & de Queiroz, R.L. (Feb. 2003). Identification of bitmap compression history: JPEG detection and quantizer estimation. IEEE Transactions on Image Processing, 12(2), 230-5. doi:http://dx.doi.org/10.1109/TIP.2002.807361.

\* cited by examiner

US 9,094,681 B1

ADAPTIVE SEGMENTATION

TECHNICAL FIELD

This disclosure relates to encoding and decoding visual data, such as video stream data for transmission or storage.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video with smooth playback.

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. These techniques in some cases encode the video stream using parameters or values that vary for different segments of blocks within frames.

SUMMARY

Embodiments of systems, methods, and apparatuses for encoding and decoding a video signal are disclosed herein. One aspect of the disclosed embodiments is a computer-implemented method for encoding a video including a plurality of frames capturing a scene having multiple objects positioned therein. The method includes receiving, at one or more computing devices, a first one of the plurality of frames. A first location, associated with a first object in the scene, is identified in the first frame. A first region is identified that includes the first location, along with a second region proximate to the first location. The first region contains a plurality of blocks that are each located, at least partially, within a first distance range relative to the first location. The second region contains a second plurality of blocks that are each located, at least partially, within a second distance range relative to the first location. A first coding parameter value is identified, along with a second coding parameter value based on at least one of the second distance range or a gradient value. At least one of the first plurality of blocks is encoded using the first coding parameter value. At least one of the second plurality of blocks is encoded using the second coding parameter value. The first location, the gradient value, and at least one of the first or second distance ranges are encoded into the bitstream of encoded blocks.

Another aspect of the disclosed embodiments is a computer-implemented method for encoding a video stream including at least one frame. The method includes receiving, at one or more computing devices, a frame of the video stream. A first location is identified in the frame. A plurality of regions is identified in the frame. The regions are spaced relative to the first location at intervals defined by a step distance. A first coding parameter is identified along with a step size by which the first coding parameter varies between regions. For at least one of the plurality of regions, a region-specific coding parameter is identified based on the first coding parameter and the step size. At least one block in the at least one region is encoded into a bitstream using the region-specific coding parameter. The first location, the step distance and the step size are stored in the bit stream.

Another aspect of the disclosed embodiments is a computer-implemented method for decoding a video stream including at least one encoded frame having a plurality of blocks. The method includes receiving, at one or more computing devices, the encoded video data. At least one encoded frame and a first location within the at least one encoded frame are identified. A base value for a coding parameter, a step distance defining a plurality of regions in the frame relative to the first location, and a step size defining a change in the value of the coding parameter are also identified. An encoded block in one of the plurality of regions is identified. A region-specific value of the coding parameter is identified based on the first coding parameter, and the step size. The identified encoded block is decoded using the identified region-specific value of the coding parameter.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
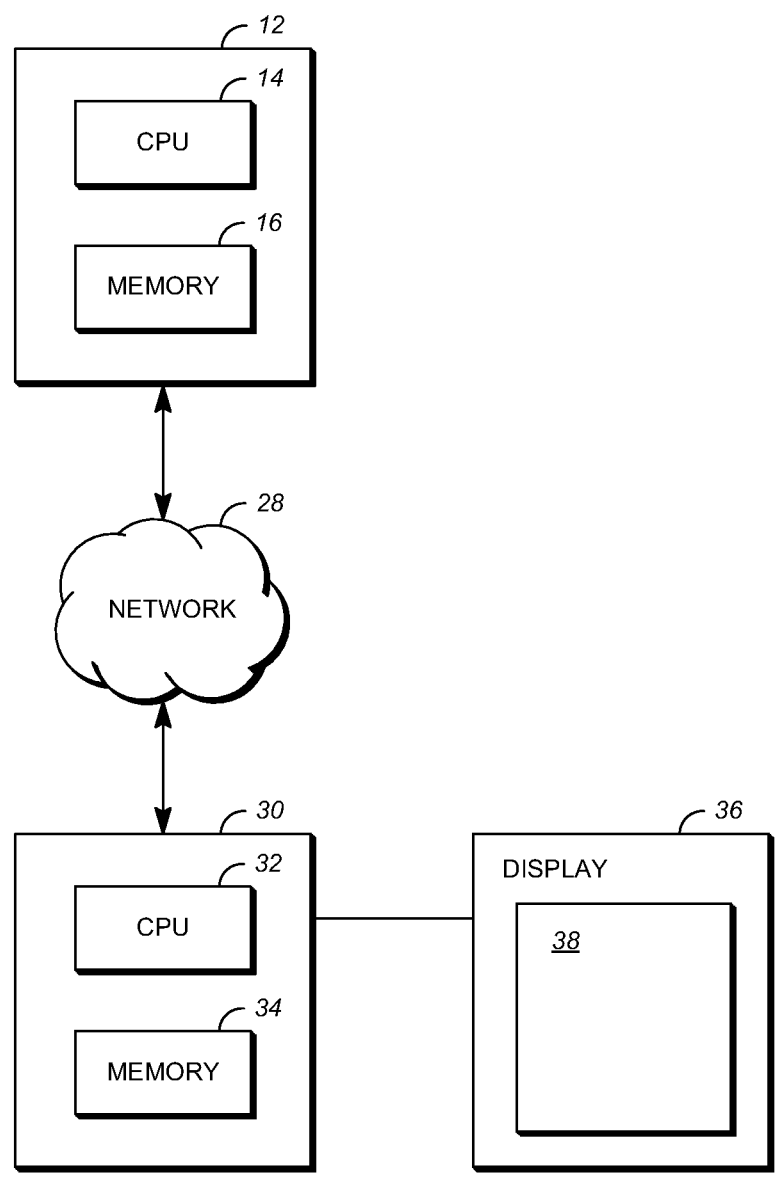
FIG. 1 is a schematic of a video encoding and decoding system.

Digital video is used for various purposes including, for example, remote business meetings via video conferencing, high definition video entertainment, video advertisements, and sharing of user-generated videos. Digital video streams can be in formats such as present and future versions of VPx and H.264.

In some of the embodiments described below, video streams can be encoded with different values of coding parameters (such as quantizer Q) for different regions or segments. For example, an encoder can specify one or more center locations (also referred to herein as center points) within a frame. A center location can be specified, for example, by an X-Y coordinate of a block within a frame. A center location need not be central relative to the entire frame and may be a single block or group of blocks. A base value of the coding parameter can also be specified for each of the locations. In some cases, a center location corresponds to an object of interest in the frame, such as the head of a person talking. Such a location can be encoded with higher fidelity (e.g., less loss) such as by using a lower value of Q. Blocks within the frame that are farther removed from the center location are potentially of less interest and can therefore be encoded with less fidelity (e.g., more loss), such as by using a higher value of Q. In other examples, the center location is an area of less interest that can be encoded with more loss. Blocks within the frame that are farther removed from the center location are potentially, in this example, of greater interest and can therefore be encoded with higher fidelity (e.g., less loss), such as by using a lower value of Q. In some of the disclosed embodiments, the value for Q is determined for a given block using a function based on the proximity of that block to the center location.

In some cases, a frame can be encoded with information in the encoded bitstream that specifies the position of the one or more center locations and additional values that indicate the rate of change of the coding parameters relative to distance from the specified one or more center locations. Some embodiments may allow independent specification of the rate of change in, for example, X and Y dimensions. In some cases, rate of change may optionally be defined using a step distance and gradient value in the form of a step size. For example, if the step distance is 10 units, then all blocks that are less than 10 units away from the specified location of interest can have the same coding parameter value (e.g., Q value). Blocks or pixels that are greater than or equal to 10 units away from the center point but less than 20 units, can have a coding parameter value that can be equal to the center location's value offset by the step size.

Thus, a frame in embodiments of this disclosure includes a plurality of regions or segments. As used herein, unless described otherwise, the term "region" and "segment" are used interchangeably. The frame can, in one example, include a plurality of regions or segments in the form of rings defined by concentric circles (see, for example, FIGS. 6A and 6B). The step distance can be the distance between concentric rings (or, in the case of the inner ring, the radius of the first concentric circle). The step size can in some cases be the gradient value or amount by which the coding parameter value (e.g., Q) changes from one ring to the next adjacent ring. Note that the step size may be positive or negative meaning that the coding parameter value can be increased or decreased based on distance from the center location. In other embodiments, the coding parameter for a particular block can be determined as a function of that block's distance from the center location without necessarily placing the block in a discrete segment or region defined by a distance range (e.g., a concentric ring). For example, the distance of a given block from the center location can be multiplied by a gradient value (e.g., 1.6) to yield the coding parameter value for that block.

These and other examples are now described with reference to the accompanying drawings. FIG. 1 is a schematic of a video encoding and decoding system. An exemplary transmitting station 12 can be, for example, a computing device having an internal configuration of hardware including a processor such as a central processing unit (CPU) 14 and a memory 16. The CPU 14 can be a controller for controlling the operations of the transmitting station 12. The CPU 14 is connected to the memory 16 by, for example, a memory bus. The memory 16 can be random access memory (RAM) or any other suitable memory device. The memory 16 can store data and program instructions which are used by the CPU 14. Other suitable implementations of the transmitting station 12 are possible. Throughout this disclosure, the term "computing device" includes any device capable of processing information including without limitation: servers, hand-held devices, laptop computers, desktop computers, special purpose computers, and general purpose computers programmed to perform the techniques described herein.

A network 28 can connect the transmitting station 12 and a receiving station 30 for encoding and decoding of the video stream. Specifically, the video stream can be encoded in the transmitting station 12 and the encoded video stream can be decoded in the receiving station 30. The network 28 can, for example, be the Internet. The network 28 can also be a local area network (LAN), wide area network (WAN), virtual private network (VPN), or any other means of transferring the video stream from the transmitting station 12.

The receiving station 30, in one example, can be a computing device having an internal configuration of hardware including a processor such as a central processing unit (CPU) 32 and a memory 34. The CPU 32 is a controller for controlling the operations of the receiving station 30. The CPU 32 can be connected to the memory 34 by, for example, a memory bus. The memory 34 can be RAM or any other suitable memory device. The memory 34 stores data and program instructions which are used by the CPU 32. Other suitable implementations of the receiving station 30 are possible.

A display 36 configured to display a video stream can be connected to the receiving station 30. The display 36 can be implemented in various ways, including by a liquid crystal display (LCD) or a cathode-ray tube (CRT). The display 36 can be configured to display a video stream decoded at the receiving station 30.

Other implementations of the encoder and decoder system 10 are possible. For example, one implementation can omit the network 28 and/or the display 36. In another implementation, a video stream can be encoded and then stored for transmission at a later time by the receiving station 30 or any other device having memory. In one implementation, the receiving station 30 receives (e.g., via network 28, a computer bus, and/or some communication pathway) the encoded video stream and stores the video stream for later decoding. In another implementation, additional components can be added to the encoder and decoder system 10. For example, a display or a video camera can be attached to the transmitting station 12 to capture the video stream to be encoded.

Figure 2:
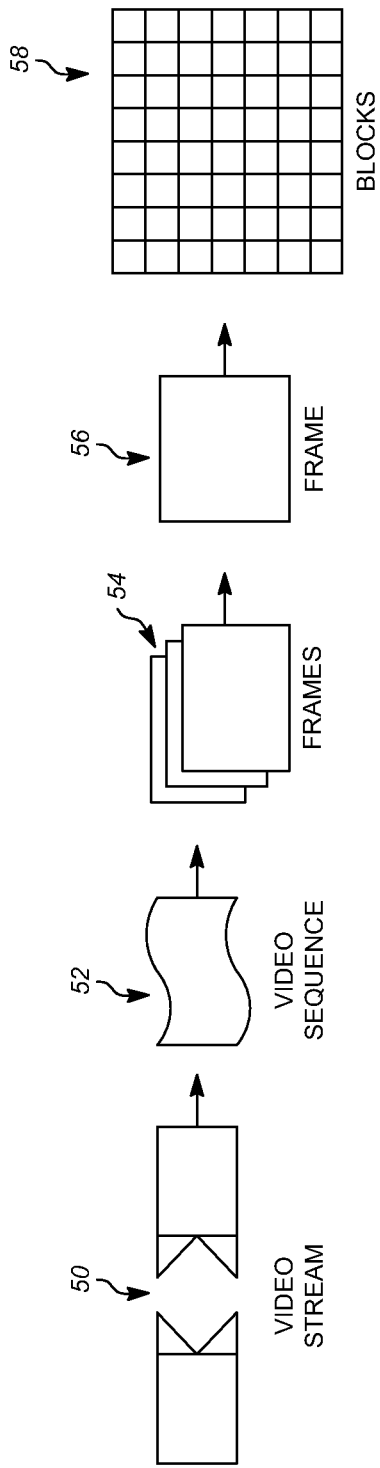
FIG. 2 is a diagram of a typical video stream to be encoded and decoded.

FIG. 2 is a diagram of a typical video stream 50 to be encoded and decoded. The video stream 50 includes a video sequence 52. At the next level, the video sequence 52 includes a number of adjacent frames 54. While three frames are depicted in adjacent frames 54, the video sequence 52 can include any number of adjacent frames. The adjacent frames 54 can then be further subdivided into a single frame 56. At the next level, the single frame 56 can be divided into a series of blocks 58, which can contain data corresponding to, for example, a 16×16 group of pixels in the frame 56. Each block can include luminance and chrominance data for the corresponding pixels. The blocks 58 can also be of any other suitable size such as 16×8 pixel groups or 8×16 pixel groups.

Figure 3:
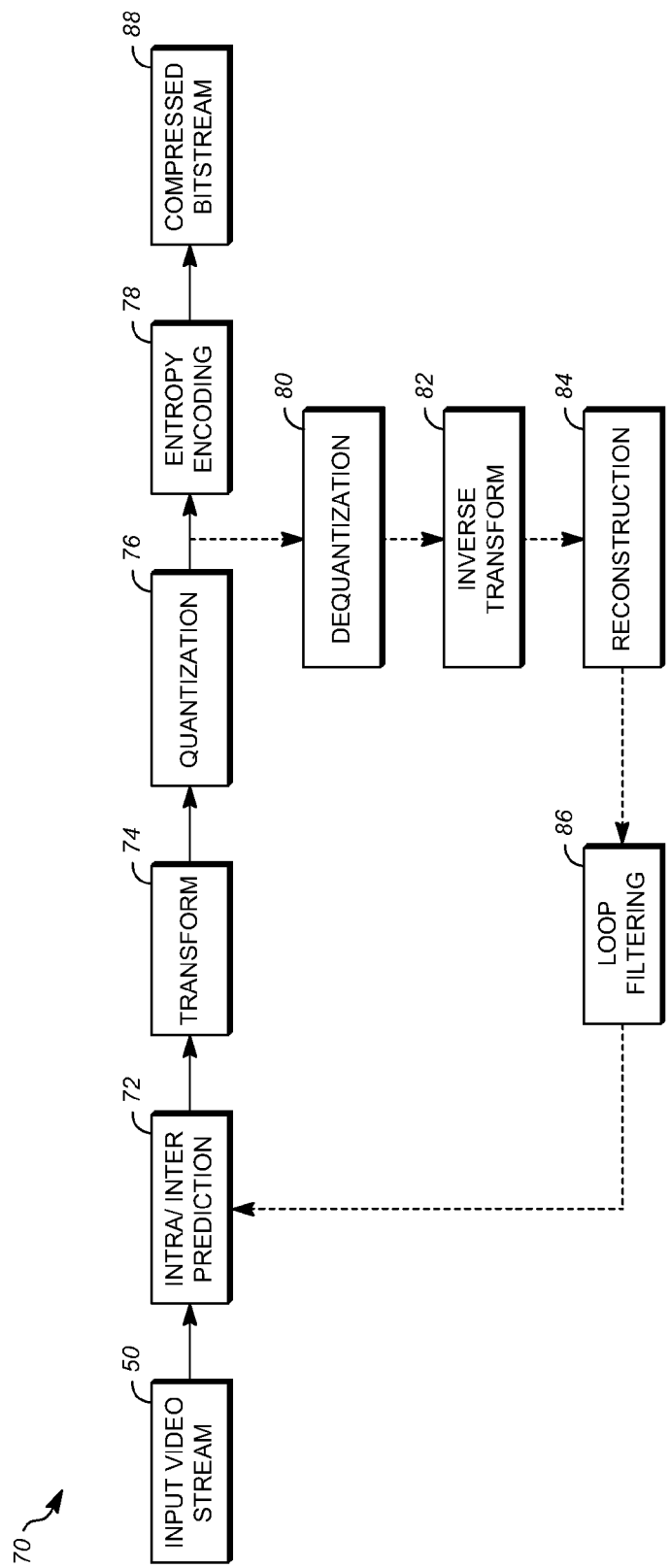
FIG. 3 is a block diagram of a video compression system in accordance with one embodiment.

FIG. 3 is a block diagram of an encoder 70 in accordance with one embodiment. The encoder 70 can be implemented, as described above, in the transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. The encoder 70 encodes an input video stream 50. The encoder 70 has the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. The encoder 70 also includes a reconstruction path (shown by the dotted connection lines) to reconstruct a frame for encoding of further blocks. The encoder 70 has the following stages to perform the various functions in the reconstruction path: a dequantization stage 80, an inverse transform stage 82, a reconstruction stage 84, and a loop filtering stage 86. Other structural variations of the encoder 70 can be used to encode the video stream 50.

When the video stream 50 is presented for encoding, each frame 56 within the video stream 50 is processed in units of blocks. At the intra/inter prediction stage 72, each block can be encoded using either intra-frame prediction (e.g., within a single frame) or inter-frame prediction (e.g., from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at the intra/inter prediction stage 72 to produce a residual block. The transform stage 74 transforms the residual block into transform coefficients in, for example, the frequency domain. Examples of block-based transforms include the Karhunen-Loève Transform ("KLT"), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

The quantization stage 76 converts the transform coefficients into discrete quantum values, which are referred to as quantized transform coefficients or quantization levels. The quantized transform coefficients are then entropy encoded by the entropy encoding stage 78. The entropy-encoded coefficients, together with the information used to decode the block, such as the type of prediction used, motion vectors, and quantizer value, are then output to the compressed bitstream 88. The compressed bitstream 88 can be formatted using various techniques, such as run-length encoding (RLE) and zero-run coding.

The reconstruction path in FIG. 3 (shown by the dotted connection lines) can be used to provide both the encoder 70 and a decoder 100 (described below) with the same reference frames to decode the compressed bitstream 88. The reconstruction path performs functions that are similar to functions that take place during the decoding process that are discussed in more detail below, including dequantizing the quantized transform coefficients at the dequantization stage 80 and inverse transforming the dequantized transform coefficients at the inverse transform stage 82 to produce a derivative residual block. At the reconstruction stage 84, the prediction block that was predicted at the intra/inter prediction stage 72 can be added to the derivative residual block to create a reconstructed block. The loop filtering stage 86 can be applied to the reconstructed block to reduce distortion such as blocking artifacts.

Other variations of the encoder 70 can be used to encode the compressed bitstream 88. For example, a non-transform based encoder 70 can quantize the residual block directly without the transform stage 74. In another embodiment, an encoder 70 can have the quantization stage 76 and the dequantization stage 80 combined into a single stage.

Figure 4:
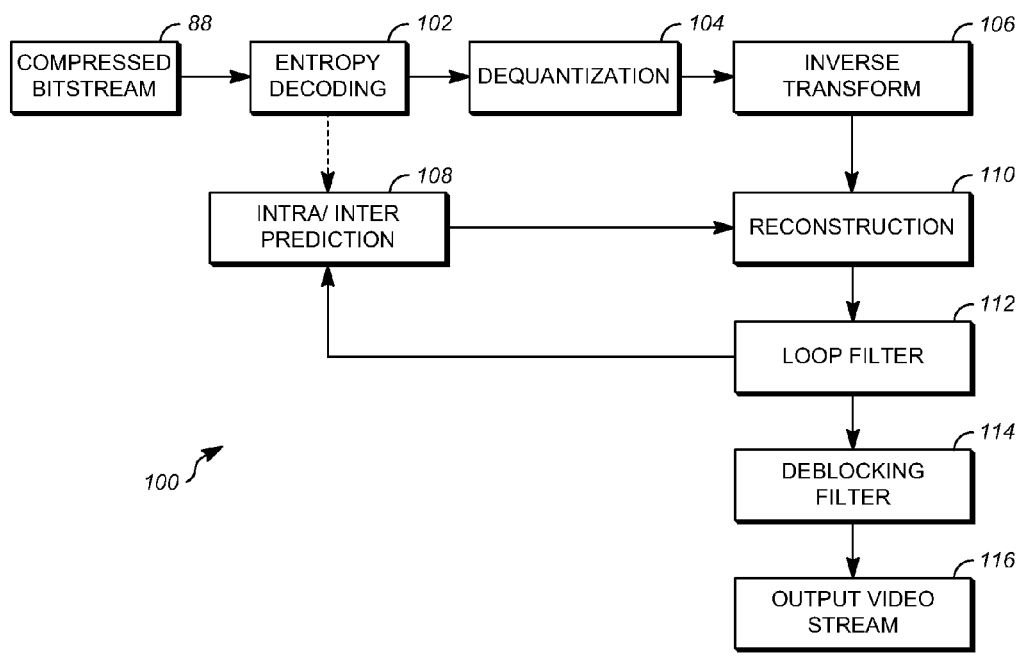
FIG. 4 is a block diagram of a video decompression system in accordance with another embodiment.

FIG. 4 is a block diagram of a decoder 100 in accordance with another embodiment. The decoder 100 can be implemented, for example, in the receiving station 30, such as by providing a computer software program stored in memory 34 for example. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

The decoder 100, similar to the reconstruction path of the encoder 70 discussed above, includes in one example the following stages to perform various functions to produce an output video stream 116 from the compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of the decoder 100 can be used to decode the compressed bitstream 88.

When the compressed bitstream 88 is presented for decoding, the data elements within the compressed bitstream 88 can be decoded by the entropy decoding stage 102 (using, for example, Context Adaptive Binary Arithmetic Decoding) to produce a set of quantized transform coefficients. The dequantization stage 104 dequantizes the quantized transform coefficients, and the inverse transform stage 106 inverse transforms the dequantized transform coefficients to produce a derivative residual block that can be identical to that created by the inverse transformation stage 82 in the encoder 70. Using header information decoded from the compressed bitstream 88, the decoder 100 can use the intra/inter prediction stage 108 to create the same prediction block as was created in the encoder 70. At the reconstruction stage 110, the prediction block can be added to the derivative residual block to create a reconstructed block. The loop filtering stage 112 can be applied to the reconstructed block to reduce blocking artifacts. The deblocking filtering stage 114 can be applied to the reconstructed block to reduce blocking distortion, and the result is output as the output video stream 116.

Other variations of the decoder 100 can be used to decode the compressed bitstream 88. For example, the decoder 100 can produce the output video stream 116 without the deblocking filtering stage 114.

Figure 5:
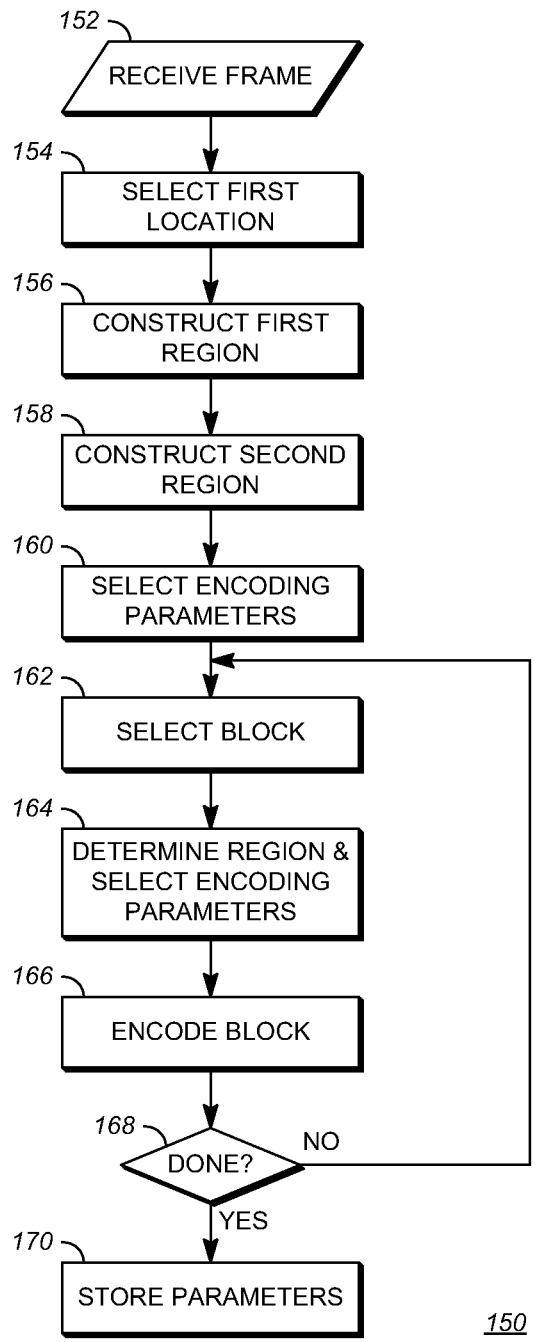
FIG. 5 is a flowchart of a method of operation which encodes blocks using coding parameter values determined according to an embodiment of this disclosure.

FIG. 5 is a flowchart showing a method of operation 150 for encoding a video stream that can be implemented in an encoder such as encoder 70 to select values of coding parameters (such a quantizer Q) used by encoder 70 to encode a video signal. Method of operation 150 can be implemented, for example, as a software program that is executed by computing devices such as transmitting station 12 or receiving station 30. For example, the software program can include machine-readable instructions that are stored in a memory such as memory 16 or memory 34, and that when executed by a processor, such as CPU 14 or CPU 32, cause the computing device to perform the method of operation 150. Method of operation 150 can also be implemented using specialized hardware. As explained above, some computing devices may have multiple memories and multiple processors, and the steps of method of operation 150 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

At a step 152, a frame of video data is received by a computing device, such as transmitting station 12 that is implementing the method of operation 150. The video data (also referred to herein as a video stream) has a plurality of blocks that in some cases can be organized into frames. Each frame can capture a scene with multiple objects, such as people, background elements, graphics, text, a blank wall, or anything that can be represented in video data. Video data can be received in any number of ways, such as by receiving the video data over a network, over a cable, or by reading the video data from a primary memory or other storage device, including a disk drive or removable media such as a CompactFlash (CF) card, Secure Digital (SD) card, or the like.

Figure 6A:
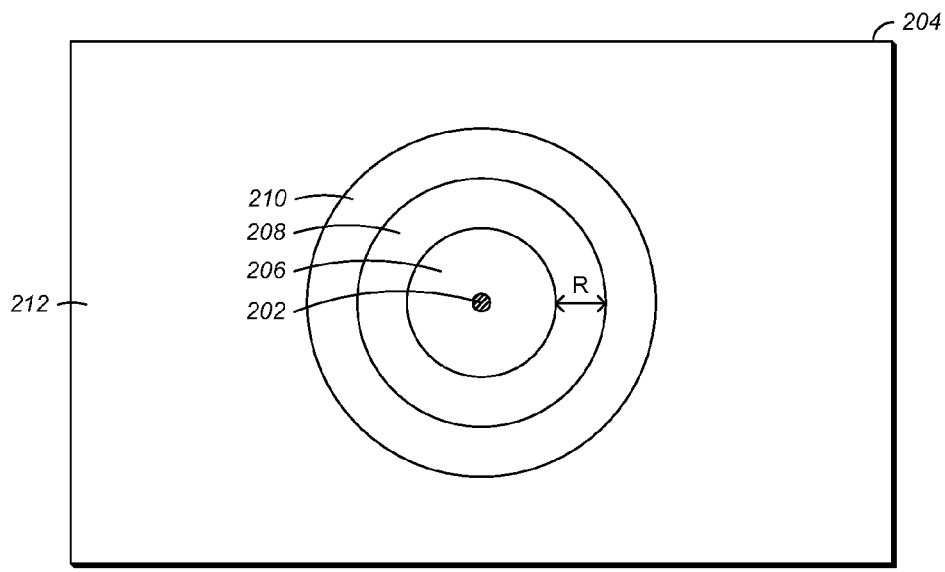
FIG. 6A is a diagram of a video frame showing a point of interest and segments defined in accordance with one embodiment.

In step 154, a center or first location is identified in the frame of video data. The center location corresponds to at least one of the plurality of blocks in at least one frame. The term "identifies" as used herein means to select, construct, determine, specify or otherwise identify in any manner whatsoever. Referring to FIG. 6A, location 202 is an example of a center location identified in a frame of video data. In some cases, the location can be identified by performing any one of a variety of feature extraction or segmentation routines to identify a location in the video frame which is of "interest" relative to surrounding locations. A location can be of interest if, for example, it includes an object in the scene captured by the frame where the object might be of more interest (e.g., viewed more often or more closely) to viewers than other objects in the frame. Examples of interesting regions in a video frame may include images of people's faces or objects that are moving with respect to the background.

At step 156, the computing device constructs or otherwise identifies, in the frame, a first region. The first region in some cases contains the first location. The first region contains a first plurality of blocks, each at least partly located within a first distance range relative to the first location. Referring to FIG. 6A, region 206 is an example of a first region that can be constructed or otherwise identified in the frame and that includes the first location 202. In this example, region 206 is a circular region defined by a circle circumscribing the first location 202. The first distance range in this case is defined by the radius of the circle that defines region 206. In practice, the first region need not be circular and the blocks in the first region need not be continuous.

At a step 158, the computing device constructs or otherwise identifies, in the frame, a second region that contains a second plurality of blocks each at least partly located within a second distance range relative to the first location. The second region can be proximate to the first region, meaning adjacent, partially adjacent, or close by. Referring to FIG. 6A, region 208 is an example of a second region that can be constructed or otherwise identified in the frame and that contains a second plurality of blocks each at least partly located within a second distance range relative to the first location. In this example, region 208 is an annulus, surrounding region 206, and defined by two concentric circles: an inner circle and an outer circle. The second distance range in this case is defined by the radius of the inner concentric circle and the radius of the outer concentric circle.

For simplicity of explanation, only two regions are identified in method of operation 150. In practice, more regions can be identified, as illustrated by concentric rings of FIG. 6A. Further, for simplicity of explanation, the method of operation 150 is depicted and described as a series of steps. However, steps in accordance with this disclosure can occur in various orders and/or concurrently. For example, while in FIG. 5, the first region appears to be identified at 156 before the second region is identified at 158, it shall be appreciated that regions may be identified in other orders and remain within the scope of this disclosure. For example, the second region may be identified before or concurrently with the identification of the first region. Additionally, steps in accordance with this disclosure may occur with other steps not presented and described herein. Furthermore, not all illustrated steps (e.g., 170) may be required to implement a method in accordance with the disclosed subject matter.

At a step 160, the computing device selects or otherwise identifies a first coding parameter value, and a second coding parameter value based on at least one of the second distance range or a gradient value. For example, coding parameter values are selected for each region identified in steps 156 and 158. These coding parameter values are selected to differentially encode blocks depending upon their location in the video frame, as explained below in connection with the examples shown in FIGS. 6A and 6B. For example, a first coding parameter value can be selected in the form of a quantization value. A second coding parameter value can be selected by incrementing the quantization value by a gradient value. The coding parameter values are region-specific in that they are determined for at least one region based at least in part on that region's proximity to the first location. Different regions may have different coding parameter values.

At a step 162, a block from the video frame is selected. In one implementation of video frame processing, the blocks of the video frame are processed in raster scan order beginning at the upper left hand corner of the video frame. At step 164, the location of the selected block in the video frame is examined to determine whether it belongs to a particular region, e.g., constructed in steps 156 and 158, and coding parameter values are selected for the block based on the coding parameter values previously selected for that particular region. At a step 166, the block is encoded using the selected coding parameter values. At a step 168, the method of operation 150 checks to see if all of the blocks to be encoded have been encoded, and if not, loops back to select another block in step 162. If no more blocks remain to be encoded, at step 170 the information used to locate and identify the regions and coding parameter values is stored in the bitstream containing the encoded blocks. In some cases, this information includes the position of the first location, a parameter to determine the first and second distance ranges (e.g., a step distance R as shown in FIG. 6A), and a base coding parameter value associated with the first location. A decoder, upon receiving the bitstream, can determine the proper coding parameter value for each region (or "segment") based on a specification of the first location, a determination of the location of each region relative to the base location, and the gradient value. The gradient value can permit the decoder to determine how the coding parameter value varies between adjacent regions.

Figure 6B:
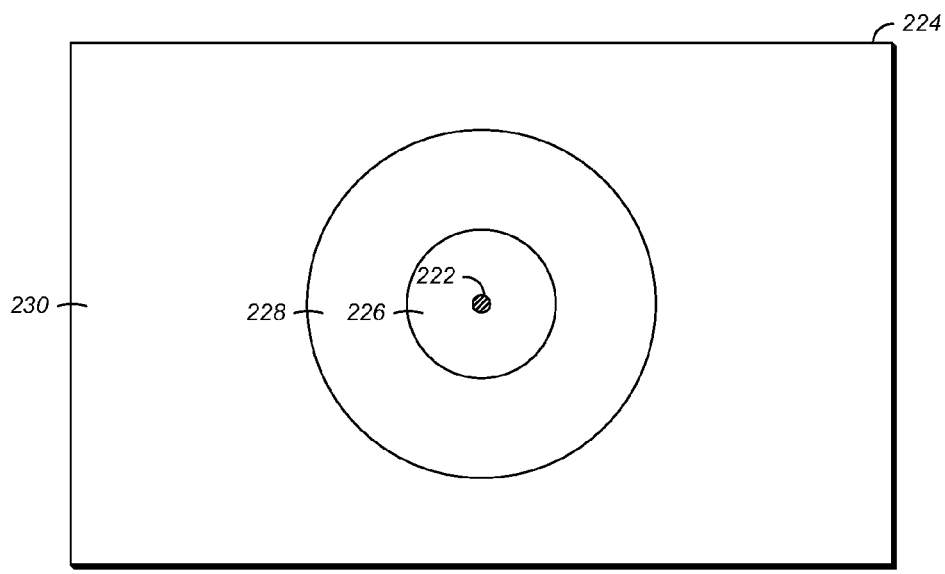
FIG. 6B is a diagram of a video frame showing a point of interest and segments defined in accordance with another embodiment.

One example for applying the method of operation 150 is illustrated with reference to FIGS. 6A and 6B. FIG. 6A shows a video frame 204 with a selected location 202 and regions 206, 208 and 210 constructed according embodiments of this disclosure. In an embodiment of this disclosure, regions are constructed by selecting a step size where the step size "Step" is the increment in radius measured in frame coordinates for each region. For example, region 206 includes the initial location 202 and all blocks occurring within a radius of "Step" or less from the location 202. Region 208 includes all blocks with locations in the frame occurring within a radius r=2*Step from the location 202 not included in the region 206. In the same fashion, region 210 includes all blocks occurring within a radius r=3*Step or less from location 202 not included in regions 206 and 208. The remaining area of the frame 212 includes areas of the frame not included in one of the defined regions 206, 208 or 210. The step size is an example of a distance which could be varied in order to produce a change in the region size. There are other ways in which a varying distance could correspond with a varying region size. For example, a distance could be generated by establishing a boundary based on a maximum allowable pixel or block count in the region. Another example might be to select a distance with the effects on an end-user's perception of quality. For example, it might be desirable to provide an increased video quality at a distance around a location which corresponds to a physical measurement of a computer or TV monitor. An example of this might be to select a distance that corresponds to 1" on a 28" viewing device. In some embodiments, the distance may not be fixed in any direction, and/or may not correspond to a region which is continuous, mirrored, or uniform.

Having constructed, defined, or otherwise identified the regions 206, 208, 210 and 212, illustrative embodiments of this disclosure can assign coding parameter values to each region. Coding parameter values may be selected, for example, to adjust the relative number of bits used to encode blocks occurring in regions closer to the selected center location 202. Other coding parameters, such as loop filter type and strength or motion vector prediction parameters can also be selected. In general, network bandwidth and hence the number of bits available to encode a video frame is limited. Embodiments of this disclosure select coding parameter values based on defined regions 206, 208, 210 and 212 about a location 202 to encode portions of the frame using, for example, more bits per blocks in selected regions while encoding other portions of the frame using fewer bits as opposed to conventional techniques where all blocks may be encoded using the same coding parameter values. Using more bits to encode regions of a frame can provide greater perceived image quality for those regions as compared to regions of the frame encoded using fewer bits.

An example of a coding parameter that may be selected to provide greater or fewer encoding bits per block is quantization "Q". Quantization refers to a variable input to the encoder that determines how many quantization levels the output from the encoder will occupy. From one perspective, the larger this number, the greater the degree of compression is applied to the frame data. Embodiments of this disclosure select an initial value for Q to be applied to the blocks occurring in the first region 206 surrounding the location 202 along with a gradient "g" to be applied to Q for each successive region. For example, the value of Q for the $n^{th}$ region (assuming that n=0 for the most central region) is given by the following equation:

$$Q_n = Q_0 + (g*n) \tag{1}$$

where $Q_n$ is the new value to be applied to the current or $n^{th}$ region, $Q_0$ is the initial value of Q and n is the integer number of the region, where, for example, region 206 is the $0^{th}$ region, region 208 is the $1^{st}$, region 210 is the $2^{nd}$ region and region 212 is $3^{rd}$ region. The variable n can in some cases be a multiplier (e.g., 1, 2, 3 . . . ) based on the rank of a given region in the spatial ordering of regions. In one example, the gradient value g equals two. Other gradient values could also be used, including non-integer gradient values. For example, a non-integer gradient value could be specified and a rounding operation performed during the calculation of $Q_n$, if desired. As each block is selected for encoding, embodiments of this disclosure determine in which previously defined region the block occurs and identifies the coding parameter value(s) associated with that region, in this case the value of Q, to use in encoding the block. In this example, assuming a starting value of coding parameter $Q_0$ is equal to ten and gradient value g is equal to two, then region 206 would be have a coding parameter value $Q_0=10$; region 208 would have a coding parameter value $Q_1$ equal to 12; region 210 would have a coding parameter value $Q_2$ equal to 14; and region 212 would have a coding parameter value $Q_3=16$. FIG. 6B shows regions defined on a video frame 224 with a selected location 222. In this example, the step size is greater than the step size shown in FIG. 6A, giving certain regions in FIG. 6B a larger affiliated radius. Processing can proceed as outlined above, with coding parameter values assigned to regions according to the initial value of the parameters, step number and gradient. In this example, assuming that the coding parameter to be used is again quantizer Q, a starting value of 10 and a gradient of 2 yields a Q value of 10 for region 226, a Q value of 12 for region 228 and a Q value of 14 for region 230 (or the rest of the frame 224). The regions defined in FIGS. 6A and 6B can also be applied to illustrate how embodiments of this disclosure handle changes in scale in input video frames. Assume for example that the video frame in FIG. 6A has defined regions of interest around a location which corresponds to an object in the video frame. Assume also that in FIG. 6B, the video frame has been zoomed to increase the area occupied by the object. Embodiments of this disclosure can process this by increasing the step size to increase the size of the regions as shown in FIG. 6B to encompass the zoomed (enlarged) image of the object in the frame and encode the blocks which represent the object in a similar fashion to FIG. 6A in spite of a change in size of the object in the frame. To accomplish this change in coding parameter values associated with a change in apparent size of an object of interest, embodiments of this disclosure may alter the step size or the gradient with which the coding parameter values are altered.

Figure 7:
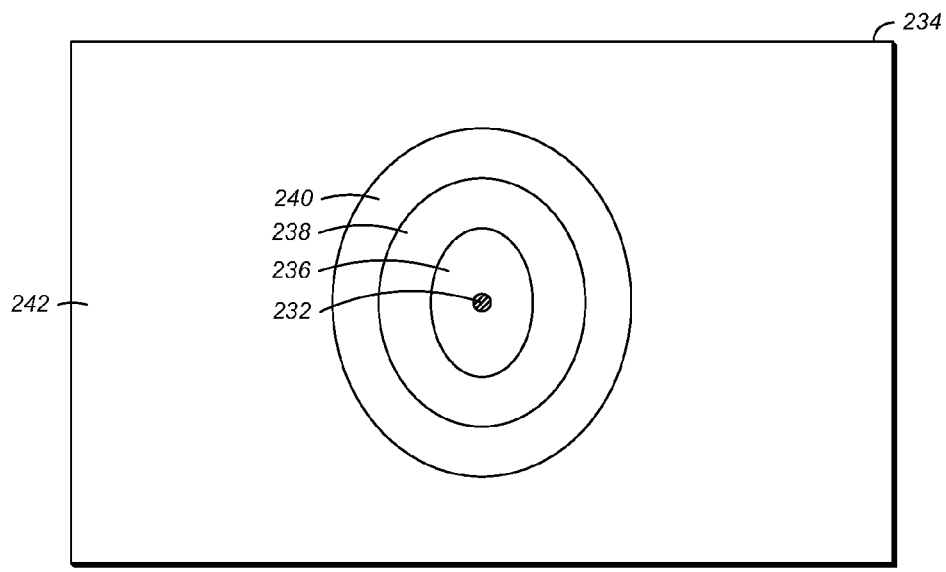
FIG. 7 is a diagram of a video frame showing a point of interest and oval segments defined in accordance with another embodiment.

FIG. 7 shows an embodiment of this disclosure having oval rather than circular segments. An oval segment may be used when a location of interest is based on, for example, a person. Oval segments can be specified by making the step size in the X-direction different than the step size in the Y-direction. Other than the equation used to calculate the oval rather than a circular boundary for each segment, the processing may proceed as described above. For example, a coding parameter value can be assigned to each segment 236, 238, 240, 242 in the frame 234 based on its distance from the center location 232 and a gradient. In this example, assume again that quantizer Q is the coding parameter used and an initial Q value of 10 assigned to the segment closest to the location of interest, e.g., first segment 236. Values of Q can be calculated by calculating a step size which differs in X and Y as calculated by the distance formula for an oval where the step s can be calculated differently in the X and Y directions proportional to the major and minor axes an oval with the major axis parallel to the Y direction, for example. Applying this to the example in FIG. 7, assuming a step size of 1 and a gradient of 2 yields a quantizer value of 10 for segment 236, a quantizer value of 12 for segment 238, a quantizer value of 14 for segment 240 and a value of 16 for segment 242.

Figure 8:
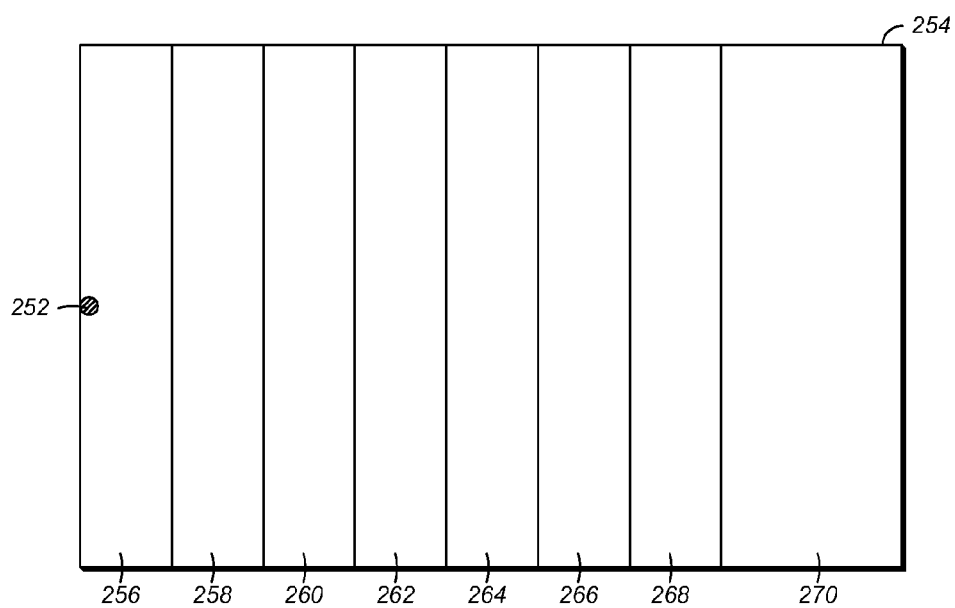
FIG. 8 is a diagram of a video frame showing a point of interest and rectangular segments defined in accordance with another embodiment.

Aspects of the disclosed embodiments can select other distance measures that may be suited for other types of change in interest in images. For example, in a video sequence that shows an object entering the frame from the left-hand side, the viewer's interest may be drawn to the left-hand side of the frame with interest diminishing as distance from the left-hand edge increases. FIG. 8 shows a video frame or image 254 with a location 252 selected and several rectangular segments defined 256, 258, 260, 262, 264, 266, 268, and 270. These segments are defined on a Cartesian coordinate system by establishing a range for, in this case the Y index, which is allowed to range from the top of the frame or image to the bottom of the frame or image. Other ranges could restrict the Y index values to a more limited range, making the rectangular segments smaller than the frame or image in the Y direction. The index in the X direction is incremented by a step size for the indicated number of steps to form the segments shown in FIG. 8. Each segment is assigned a coding parameter (for example a quantizer value) based on a gradient, step size and step number and the blocks of the video frame or image are then encoded using coding parameter values selected based on the segment in which the block occurs. The gradient in this case is defined for the X direction yielding the rectangular segments as shown in FIG. 8. Assuming a starting interest value of 10 for segment 256, a step size of 1, a maximum permitted change in the interest value of 12 and a gradient of X=2, Y=0, interest values can be assigned to segments as: 258=12, 260=14, 262=16, 264=18, 268=20, and 270=22. Embodiments of this disclosure can determine the number of regions to define on a video frame in at least three different manners assuming that initial values for coding parameters, a step size and a gradient are determined, e.g., predetermined. Certain embodiments can limit the number of regions to be defined by either selecting a maximum number of steps to calculate regions for, selecting a maximum distance within which to construct regions or selecting a maximum change in the coding parameter values allowed.

Figure 9:
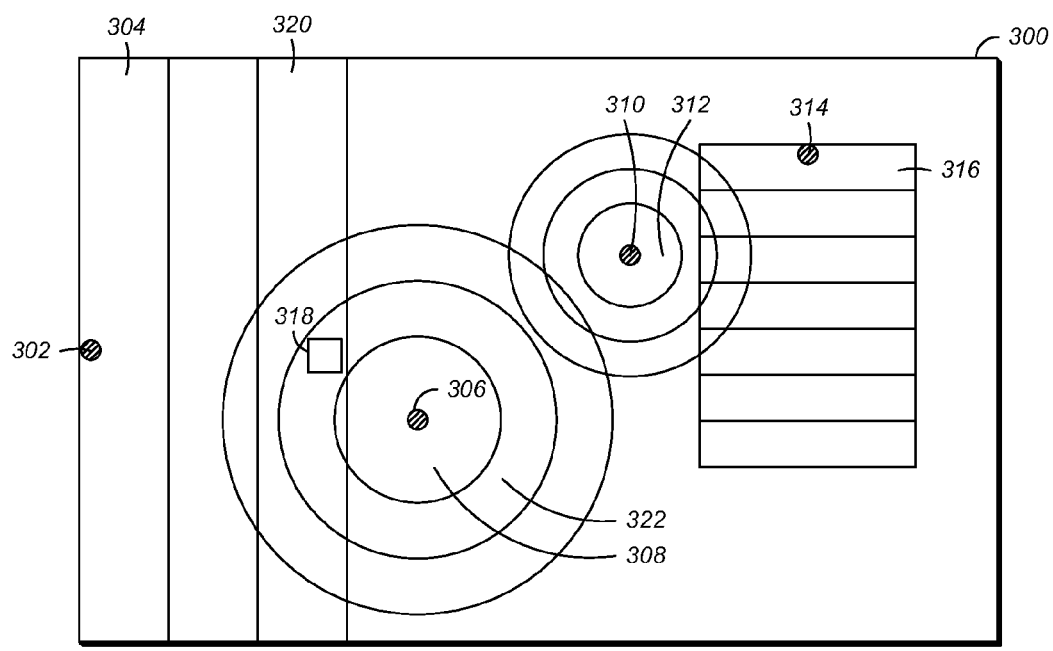
FIG. 9 is a diagram of a video frame showing points of interest and various segments defined in accordance with another embodiment.

Other embodiments permit multiple points of interest to be defined and add two or more sets of segments to a single frame or image accordingly. FIG. 9 is an embodiment of this disclosure showing multiple points of interest 302, 306, 310 and 314 in frame or image 300. Each point of interest is associated with a defined first segment, e.g., 304, 308, 312, and 316, respectively. In the example shown in FIG. 9, each set of segments is defined independently, with different step sizes and possibly different gradient values. In cases where the block to be encoded falls within more than one segment, for example the block located at 318, the calculated quantizer value can be defined as the average of the two quantizer values assigned to segments 320, 322 which depend on start locations 302 and 306, respectively. Other techniques which may be employed by embodiments of this disclosure to resolve blocks occurring in multiple segments include taking the maximum, the minimum or a weighted average based on the distance of the block location from the relevant centers of interest, e.g., 302 and 306 in this example or the nearest centers of interest in other examples.

Figure 10A:
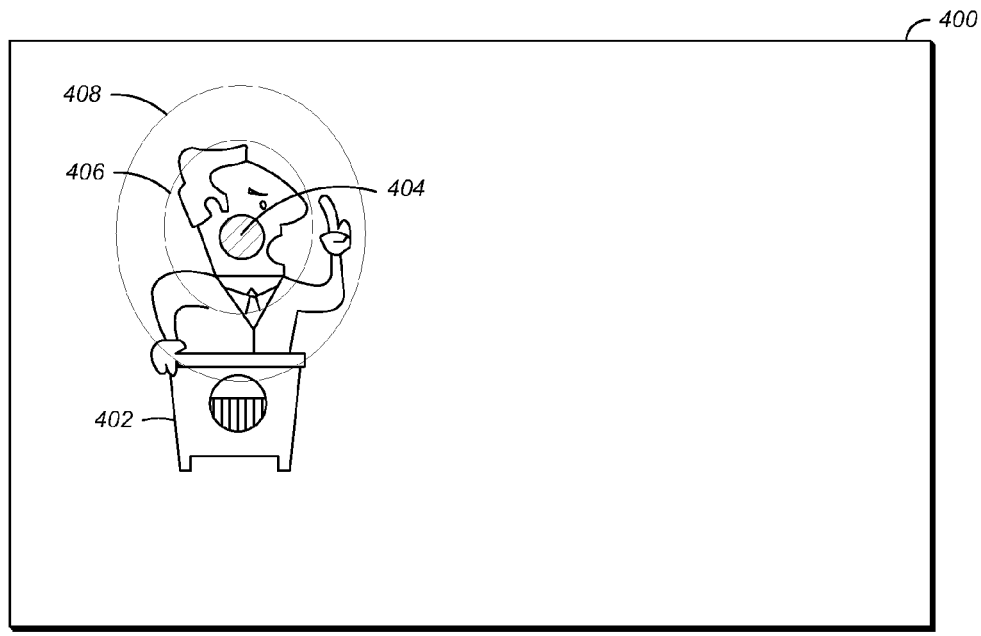
FIG. 10A is a diagram of a video frame showing a figure and a point of interest and segments defined in accordance with one embodiment.
Figure 10B:
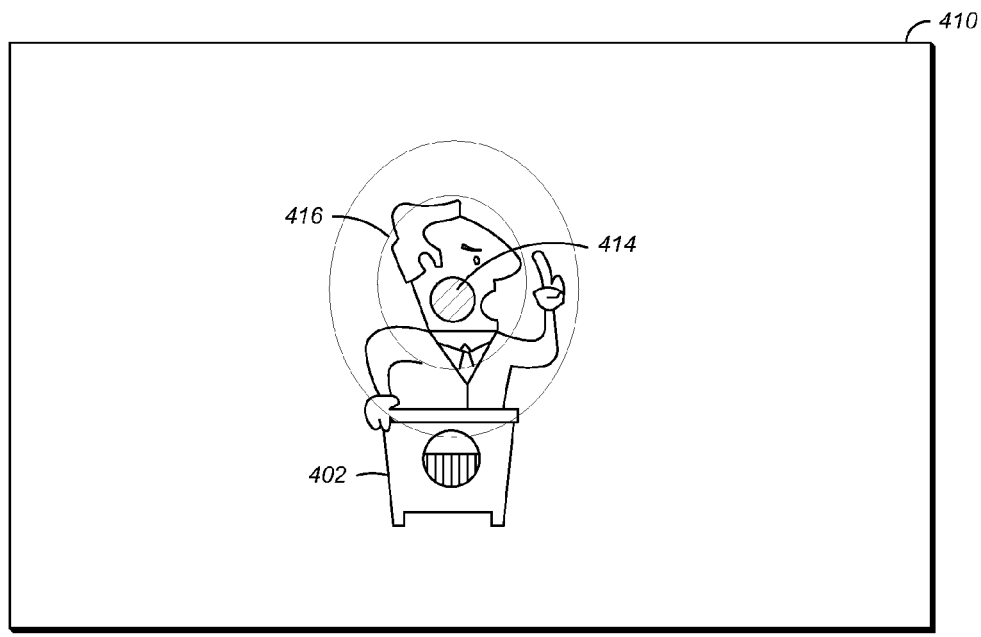
FIG. 10B is a diagram of a video frame showing a figure and a point of interest and segments defined in accordance with one embodiment.

FIGS. 10A and 10B show another aspect of the disclosed embodiments. In FIG. 10A, a frame or image 400 contains a point of interest 404 selected at a point in the frame or image 400 which contains an area of interest, in this case a FIG. 402, and the segments 406 and 408 defined around the point 404.

As described above, these segments can be used to set one or more coding parameter values to encode the blocks of the frame or image 400 differentially depending upon where a block located in the image with respect to the point of interest 404. FIG. 10B shows a frame or image 410 in which the figure of interest 402 has moved within the frame or image 410. Embodiments of this disclosure can take advantage of the fact that in cases where the change in the values of parameters which accompany the frame or image to specify the segments can be limited to a change in the location of the center of interest, such as illustrated in FIGS. 10A and 10B. In this case it would be sufficient to transmit the new X and Y coordinates of the new center of interest 414 and an indication that the previous values for the segments should be used. This type of scheme could also be used to add one or more centers of interest and segments to the center(s) of interest and segments defined on a previous frame or image without having to retransmit one or more of the original or previous parameters, thereby saving transmission or storage bandwidth. The center of interest could correspond to a prediction of the location of the figure of interest 402, moving or otherwise, e.g., based on the value of a motion vector. The region could be selected based on a prediction of movement, for example by leading or lagging behind movement or predicted movement. An asymmetrical region could also be used that corresponds to the location of the figure of interest 402, moving or otherwise.

Figure 11:
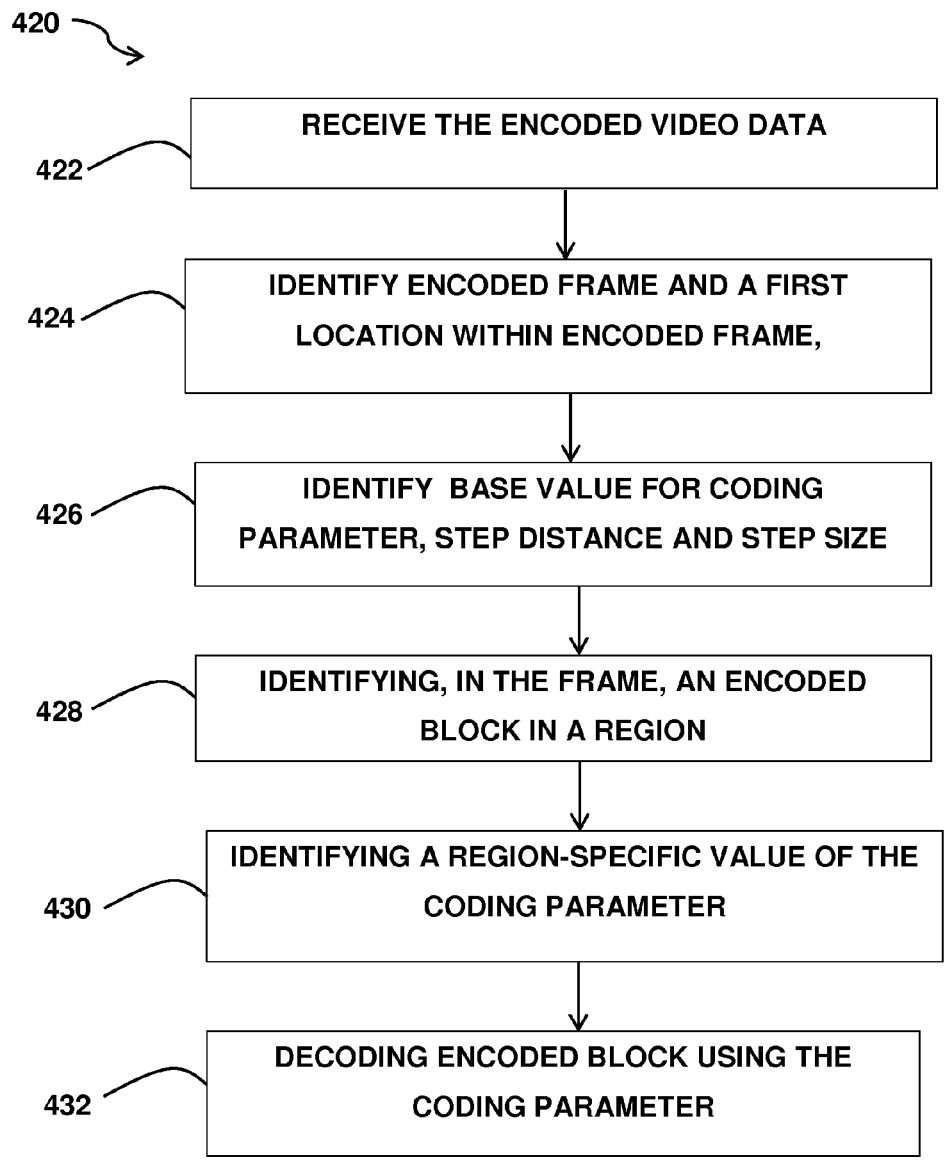
FIG. 11 is a flowchart of a method of operation that decodes blocks using parameter values determined according to an embodiment of this disclosure.

FIG. 11 is a flowchart of a method of operation 420 that decodes blocks using parameter values determined according to embodiments of this disclosure. Method of operation 420 can be implemented in a decoder, e.g., 100, to identify the value of one or more coding parameters (such a quantizer Q) used by the decoder to decode a video signal. Method of operation 420 can be implemented, for example, as a software program that is executed by computing devices such as transmitting station 12 or receiving station 30. For example, the software program can include machine-readable instructions that are stored in a memory such as memory 16 or memory 34, and that when executed by a processor, such as CPU 14 or CPU 32, cause the computing device to perform the method of operation 420. Method of operation 420 can also be implemented using specialized hardware. As explained above, some computing devices may have multiple memories and multiple processors, and the steps of method of operation 420 may in such cases be distributed using different processors and memories.

At a step 422, a computing device such as receiving station 30 receives encoded video data, such as compressed bitstream 88. The encoded video data can be received in any number of ways, such as by receiving the video data over a network, over a cable, or by reading the video data from a primary memory or other storage device, including a disk drive or removable media such as a CF card, SD card, or the like. At a step 424, the computing device identifies, in the encoded video data, at least one encoded frame and a first location within the at least one encoded frame, such as location 202 in FIG. 6A. The first location can in some cases be specified by X, Y coordinates of an encoded block within the encoded frame.

At a step 426, one or more parameters are identified. For example, a base value of a coding parameter, such as a quantizer value, can be identified. The base value is associated with the first location. At step 426, a step distance can also be identified. The step distance defines a plurality of regions in the frame (see, for example, FIG. 6A and in particular step distance. At step 426, a step size is identified. The step size defines a change in the value of the coding parameter (e.g., quantizer value) from one region to the next. These and other parameters can be identified by extracting the parameters from the encoded video data.

At step 428, an encoded block is identified in one of the plurality of regions, e.g., using the first location and the step distance. With reference to the example of FIG. 6A, the encoded block could be identified in region 208, for example. At a step 430, a region-specific value of the coding parameter (e.g., quantizer value) is identified based on the base value of the coding parameter and the step size. For example, if the base value of the coding parameter is 1 and the step size is 2, then the region-specific value of the coding parameter can be 3 computed as the base value (i.e., 1 in this example) plus N*step size (i.e., 2 in this example), where N is the rank of a given region in the spatial order of regions, staring with zero. Referring to the example of FIG. 6A, the identified block resides in region 208 (of FIG. 6A) and so N is 1 because region 208 is the $1^{st}$ region relative to the zero-th region 206 in which the first location 202 resides. At a step 432, the computing device decodes the identified encoded block using the region-specific coding parameter value. Coding parameter values which can be used in the region-specific fashion disclosed herein include quantizer value, loop filter type and strength and motion prediction parameters.

The words "example" or "exemplary" are used herein to mean serving as an example, instance, or illustration. Any aspect or design described herein as example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, molecular processors, quantum processors, programmable logic controllers, microcode, firmware, microcontrollers, servers, microprocessors, digital signal processors or any other suitable circuit or other information processing device, now existing or hereafter developed. In the claims, the term "processor" should be understood as encompassing any the foregoing hardware, either singly or in combination. The terms "signal" and "data" are used interchangeably.

Further, in one embodiment, for example, the techniques described herein can be implemented using a general purpose computer or general purpose processor with a computer program that, when executed, carries out any of the respective methods, algorithms, and/or instructions described herein. In addition or alternatively, for example, a special purpose computer/processor can be utilized which can contain specialized hardware for carrying out any of the methods, algorithms, or instructions described herein.

Further, all or a portion of embodiments of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

What is claimed is:

1. A computer-implemented method for encoding a video including a plurality of frames capturing a scene having one or more objects positioned therein, the method comprising:
   receiving, at one or more computing devices, a first one of the plurality of frames;
   identifying, in the first frame, a first location associated with a first object in the scene;
   identifying, in the first frame, a plurality of regions extending out from the first location by a predetermined step size until a limit is reached, including:
      identifying a first region including the first location by selecting a first plurality of blocks that are at least partly located within a first distance range relative to the first location, an outer perimeter of the first region based on the predetermined step size;
      assigning a first value for a coding parameter to the first region;
      identifying at least one additional region extending out from the first region wherein each additional region contains a second plurality of blocks each at least partly located within a distance range defined by outer perimeter of a previous region and the outer perimeter of the previous region incremented by the predetermined step size; and
      assigning a value for the coding parameter to each additional region after the first region by incrementing the value assigned to the previous region by a predetermined gradient value; wherein the limit comprises at least one of a maximum distance from the first location, a maximum allowed change to the value for the coding parameter from the first value, or a maximum number of regions;
   encoding the first plurality of blocks using the first coding parameter value;
   encoding the second plurality of blocks of each additional region using the value assigned to the region; and
   storing, into a bitstream of encoded blocks, the first location, the predetermined gradient value, and the predetermined step size.

2. The method of claim 1, wherein the first object is associated with a high level of user interest relative to the other objects in the scene.

3. The method of claim 1 wherein the coding parameter is a quantization level.

4. The method of claim 1 wherein the coding parameter is at least one of a loop filter type, a loop filter strength or a motion prediction parameter.

5. The method of claim 1, further comprising:
   receiving, at the one or more computing devices, a second one of the plurality of frames in which the first object in the scene has moved to a different position relative to position of the first object in the first frame;

identifying, in the second frame, a second location associated with the different position of the first object;
identifying, in the second frame, a plurality of regions extending out from the second location by the predetermined step size until the limit is reached, including:
identifying a third region including the second location by selecting a third plurality of blocks that are at least partly located within the first distance range relative to the second location, an outer perimeter of the third region based on the predetermined step size; and
identifying at least one additional region extending out from the third region, wherein each additional region contains a fourth plurality of blocks each at least partly located within the second distance range defined by the outer perimeter of a previous region and the outer perimeter of the previous region incremented by the predetermined step size;
encoding the third plurality of blocks using the first coding parameter value;
encoding the fourth plurality of blocks of each additional region using the value assigned to the region; and
storing, into the bitstream of encoded blocks, the second location.

6. The method of claim 1, further comprising:
identifying, in the first frame, a second location associated with a second object in the scene; and
identifying, in the first frame, a second region including the second location by selecting a third plurality of blocks each located at least partially within a third distance range relative to the second location, and wherein the second region overlaps at least a portion of an outermost region of the plurality of regions.

7. The method of claim 6 further comprising:
determining a second value for the coding parameter based on an average of (i) the value for the coding parameter assigned to the outermost region, and (ii) another value for the coding parameter that is assigned to the second region; and
using the second value to encode at least one block of the third plurality of blocks.

8. The method of claim 7, wherein the determining the second value further comprises:
determining a first weighting value based on the distance between the first location and the at least one block of the third plurality of blocks, and a second weighting value based on the distance between the second location and the at least one block of the third plurality of blocks; and
wherein the average is a weighted average that is determined using the first weighting value as applied to the value for the coding parameter assigned to the outermost region and the second weighing value as applied to the value that is assigned to the second region.

9. The method of claim 1, wherein each additional region is annular and defined by an inner circular periphery and an outer circular periphery, wherein the distance between the first location and the inner circular periphery, and the distance between the inner circular periphery and the outer circular periphery, are both equal to the predetermined step size.

10. The method of claim 1, wherein the first region and each additional region are oval-shaped about the outer perimeter.

11. The method of claim 1, wherein the first region and each additional region are rectilinear and the predetermined step size comprises a first value in an x-direction and a second value in a y-direction, the second value different from the first value.

12. A computer-implemented method for encoding a video stream including at least one frame, comprising:
receiving, at one or more computing devices, a frame from the video stream;
identifying, in the frame, a first location of an object of interest;
identifying, in the frame, a plurality of regions spaced relative to the first location at intervals defined by a fixed step distance;
identifying a first coding parameter and a fixed step size by which the first coding parameter varies between adjacent ones of the plurality of regions;
identifying, for at least one of the plurality of regions, a region-specific coding parameter based on the first coding parameter and the fixed step size;
encoding at least one block in the at least one region using the region-specific coding parameter; and
storing, into a bitstream, the first location, the fixed step distance and the fixed step size, wherein the plurality of regions comprises a number of regions within at least one of a maximum distance from the first location that is based on the fixed step distance, a maximum allowed change in the first coding parameter that is based on the fixed step size or a predetermined maximum number of regions.

13. The method of claim 12 where at least some of the plurality of regions have a shape that is one of circular, elliptical or rectilinear.

14. The method of claim 13, wherein identifying the region-specific coding parameter further comprises:
determining a multiplier based on the rank of the at least one region; and
identifying the region-specific coding parameter based on the first coding parameter and the fixed step size multiplied by the multiplier.

15. The method of claim 13, wherein the first coding parameter is at least one of a quantizer, loop filter type, loop filter strength or motion prediction parameters.

16. A computer-implemented method for decoding encoded video data including at least one encoded frame having a plurality of blocks, comprising:
receiving, at one or more computing devices, encoded video data;
identifying, in the encoded video data, a frame, a first location within the frame, a first base value for a coding parameter, a fixed first step distance defining a first plurality of regions in the frame, and a fixed first step size defining a change in the value of the coding parameter;
identifying, in the frame, a first encoded block in one of the first plurality of regions;
identifying a region-specific value of the coding parameter for the one of the first plurality of regions based on the first base value for the coding parameter, a number of steps by which the one of the first plurality of regions is spaced from the first location, and the fixed first step size; and
decoding the first encoded block using the region-specific value of the coding parameter for the one of the first plurality of regions.

17. The computer-implemented method of claim 16, further comprising:
identifying, in the encoded video data, a second location within the frame, a second base value for a coding parameter, a fixed second step distance defining a second plurality of regions in the frame, and a fixed second step size defining a change in the value of the coding parameter;

identifying, in the frame, a second encoded block in one of the second plurality of regions, the second encoded block also located in a second one of the first plurality of regions;

identifying a region-specific value of the coding parameter for the second one of the first plurality of regions based on the first base value for the coding parameter, a number of steps by which the second one of the first plurality of regions is spaced from the first location, and the fixed first step size;

identifying a region-specific value of the coding parameter for the one of the second plurality of regions based on the second base value for the coding parameter, a number of steps by which the one of the second plurality of regions is spaced from the second location, and the fixed second step size;

calculating a block-specific value of the coding parameter for the second encoded block by averaging the region-specific values for the second one of the first plurality of regions and the one of the second plurality of regions; and decoding the second encoded block using the block-specific value of the coding parameter.

18. The computer-implemented method of claim 17, wherein averaging the region-specific value comprises generating a weighted average by weighting the region-specific value for the second one of the first plurality of regions by on a distance in the frame between the second encoded block and the first location and weighting the region-specific value for the one of the second plurality of regions by a distance in the frame between the second encoded block and the second location.

19. The computer-implemented method of claim 16, further comprising:

identifying, in the encoded video data, a second location within the at least one encoded frame, the fixed first step distance defining a second plurality of regions in the frame;

identifying, in the frame, a second encoded block in one of the second plurality of regions, the second encoded block also located in a second one of the first plurality of regions;

identifying a region-specific value of the coding parameter for the second one of the first plurality of regions based on the first base value for the coding parameter, a number of steps by which the second one of the first plurality of regions is spaced from the first location, and the fixed first step size;

identifying a region-specific value of the coding parameter for the one of the second plurality of regions based on the first base value for the coding parameter, a number of steps by which the one of the second plurality of regions is spaced from the second location, and the fixed first step size;

calculating a block-specific value of the coding parameter for the second encoded block by averaging the region-specific values for the second one of the first plurality of regions and the one of the second plurality of regions; and decoding the second encoded block using the block-specific value of the coding parameter.

20. The computer-implemented method of claim 19, wherein averaging the region-specific value comprises generating a weighted average by weighting the region-specific value for the second one of the first plurality of regions by on a distance in the frame between the second encoded block and the first location and weighting the region-specific value for the one of the second plurality of regions by a distance in the frame between the second encoded block and the second location.

* * * * *